(12) United States Patent
Schumann

(10) Patent No.: US 12,449,647 B2
(45) Date of Patent: Oct. 21, 2025

(54) LIGHT SHEET MICROSCOPE AND METHOD FOR MANIPULATING A TARGET AREA OF A SAMPLE

(71) Applicant: LEICA MICROSYSTEMS CMS GMBH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 513 days.

(21) Appl. No.: 17/915,111

(22) PCT Filed: Mar. 31, 2020

(86) PCT No.: PCT/EP2020/059130
§ 371 (c)(1),
(2) Date: Sep. 28, 2022

(87) PCT Pub. No.: WO2021/197587
PCT Pub. Date: Oct. 7, 2021

(65) Prior Publication Data
US 2023/0152562 A1    May 18, 2023

(51) Int. Cl.
*G02B 21/00*    (2006.01)
(52) U.S. Cl.
CPC ..... *G02B 21/0032* (2013.01); *G02B 21/0044* (2013.01); *G02B 21/008* (2013.01)
(58) Field of Classification Search
CPC .. G02B 21/0032; G02B 21/008; G02B 21/02; G02B 21/361; G02B 21/0076; G02B 21/367
See application file for complete search history.

(56) References Cited

U.S. PATENT DOCUMENTS

| 2010/0193673 | A1 | 8/2010 | Power et al. |
| 2015/0205087 | A1* | 7/2015 | Schumann ............. G02B 21/06 |
| | | | 359/385 |
| 2017/0139193 | A1 | 5/2017 | Iguchi |
| 2019/0049711 | A1 | 2/2019 | Schumann |

(Continued)

FOREIGN PATENT DOCUMENTS

| DE | 102007047464 A1 | 4/2009 |
| DE | 102016103182 A1 | 8/2017 |

(Continued)

*Primary Examiner* — Mustak Choudhury
(74) *Attorney, Agent, or Firm* — LEYDIG, VOIT & MAYER, LTD.

(57) ABSTRACT

A light sheet microscope includes a light source configured to emit illumination light, an optical system configured to form a light sheet from the illumination light in a sample space, the light sheet being focused in a thickness direction perpendicular to a light propagation direction thereof to form a beam waist in the thickness direction, wherein the optical system has a field diaphragm adjustable to vary a width of the light sheet in a width direction, a scanning element configured to move the light sheet a scanning distance in the sample space along a scanning direction, and a control unit configured to control the field diaphragm for adjusting the width of the light sheet and to control the scanning element for moving the light sheet by the scanning distance to manipulate a target area of a sample by scanning the target area with the beam waist.

16 Claims, 4 Drawing Sheets

(56) References Cited

U.S. PATENT DOCUMENTS

2019/0196172 A1* 6/2019 Hillman ............. G02B 21/0052
2019/0243118 A1   8/2019 Schumann
2019/0317312 A1  10/2019 Hillman
2020/0333576 A1* 10/2020 Lyuboshenko .... G01N 21/6458

FOREIGN PATENT DOCUMENTS

| DE | 102016119268 B3 | 12/2017 |
|---|---|---|
| EP | 3382440 A1 | 10/2018 |
| WO | WO 2015109323 A2 | 7/2015 |
| WO | WO 2018/089865 A1 | 5/2018 |

* cited by examiner

LIGHT SHEET MICROSCOPE AND METHOD FOR MANIPULATING A TARGET AREA OF A SAMPLE

CROSS REFERENCE TO RELATED APPLICATIONS

This application is a U.S. National Phase application under 35 U.S.C. § 371 of International Application No. PCT/EP2020/059130, filed on Mar. 31, 2020. The International Application was published in English on Oct. 7, 2021 as WO 2021/197587 A1 under PCT Article 21(2).

FIELD

The invention relates to a light sheet microscope. The invention further relates to a method for manipulating a target area of a sample using a light sheet microscope.

BACKGROUND

In some known microscopy methods, a sample is manipulated by means of targeted light irradiation, so called photo-manipulation techniques including "Fluorescence Recovery after Photobleaching" (FRAP), a local activation of so called "caged compounds", and an activation of transmembrane pumps within the context of optogenetics. The light typically used for photo-manipulation differs from the light used for illuminating the sample, e.g. by scattering or exciting fluorophores located within the sample, in that it has a much higher intensity.

Document DE 10 2016 119 268 B3 discloses a scanning oblique plane microscope. Further, document WO 2015 109 323 A2 discloses a scanning oblique plane microscope having a unit for photo-manipulation. However, the oblique plane microscope according to said document requires an additional light source for creating manipulation light and means for coupling said manipulation light into an optical system of the microscope. The need for these additional elements make the microscope less compact and increases the cost of manufacturing.

SUMMARY

In an embodiment, the present disclosure provides a light sheet microscope, comprising a light source configured to emit illumination light, an optical system configured to form a light sheet from the illumination light in a sample space, the light sheet being focused in a thickness direction perpendicular to a light propagation direction thereof to form a beam waist in the thickness direction, wherein the optical system has a field diaphragm adjustable to vary a width of the light sheet in a width direction being perpendicular to both the light propagation direction and the thickness direction, a scanning element configured to move the light sheet a scanning distance in the sample space along a scanning direction, and a control unit configured to control the field diaphragm for adjusting the width of the light sheet and to control the scanning element for moving the light sheet by the scanning distance in order to manipulate a target area of a sample by scanning the target area with the beam waist of the light sheet, the target area being defined by the width of the light sheet and the scanning distance.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
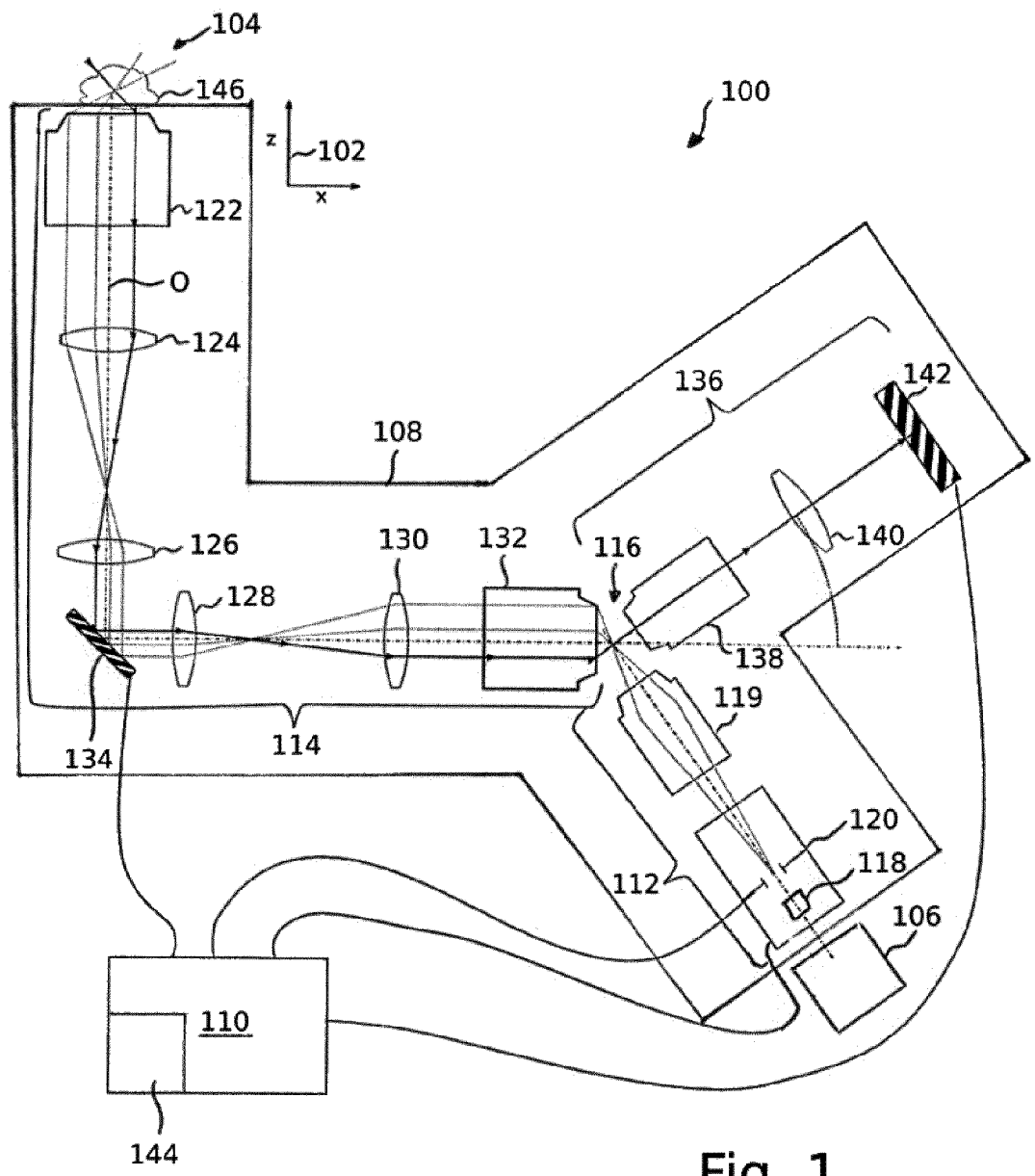
FIG. 1 is a schematic diagram of a light sheet microscope according to an embodiment.

In an embodiment, the present invention provides a light sheet microscope suitable for manipulating a sample that is compact and can be manufactured cost efficiently.

A light sheet microscope comprises a light source configured to emit illumination light, and an optical system configured to form a light sheet from the illumination light in a sample space. The light sheet is focused in a thickness direction perpendicular to a light propagation direction thereof to form a beam waist in said thickness direction. The optical system has a field diaphragm adjustable to vary a width of the light sheet in a width direction being perpendicular to both the light propagation direction and the thickness direction, a scanning element configured to move the light sheet a scanning distance in the sample space along a scanning direction, and a control unit configured to control the field diaphragm for adjusting the width of the light sheet and to control the scanning element for moving the light sheet by the scanning distance in order to manipulate a target area of a sample by scanning the target area with the beam waist of the light sheet. The target area is defined by the width of the light sheet and the scanning distance.

In the present disclosure, manipulating the sample in particular means to photo-manipulate the sample, i.e. manipulating the sample by means of targeted irradiation with light, i.e. the illumination light or manipulation light. This manipulation of the sample is distinguished from illuminating the sample, e.g. by scattering of the illumination light or exciting fluorophores located within the sample with the illumination light, in that higher intensity illumination light is used, that typically induces an effect lasting several orders of magnitude longer than effects caused by illuminating the sample. Further, the target area for manipulation the sample is typically only a small part of a field of view of the light sheet microscope. In contrast hereto illuminating the sample means illuminating the majority of the field of view of the light sheet microscope.

The beam waist of light sheet, i.e. the part of the light sheet where its thickness is minimal, defines a scan line. This scan line is moved by the scanning distance in the sample space along the scanning direction by means of the scanning element. Thereby, the target area is scanned. The exact geometry of the target area is further defined by the angle enclosed by the width direction and the scanning direction. If the width direction and the scanning direction are perpendicular to each other, the target area is a rectangle. Otherwise, the target are is a parallelogram. The length of one side of the target area is defined by the width of the light sheet and the length of another side of the target area is defined by the scanning distance. Thus, by adjusting the width of the light sheet and the scanning distance as well as the angle enclosed by the width direction and the scanning direction the geometry of the target area can be adjusted flexibly. Since the intensity density of the light sheet is highest at is beam waist, only the parts of the specimen that intersect the target area are manipulated.

The optical system used for forming the light sheet for manipulating the sample has a very simple configuration. The optical system may further be used for forming a light sheet for illuminating the sample. In particular, the light source used for forming the light sheet for manipulating the sample may be the same light source used for forming the light sheet for illuminating the sample. Thus, eliminating the need for optical switches or additional beam splitters used for coupling the illumination light into the optical system. Thereby, the light sheet microscope is very compact and can be manufactured cost efficiently.

In an embodiment the control unit is configured to control the field diaphragm and the scanning element such that the width of the light sheet is varied while the light sheet is moved along the scanning direction. In an embodiment, the target area may be e.g. a simple polygon. Thus, a greater number of geometries can be chosen for the target area. Thereby, the flexibility of the light sheet microscope is greatly increased.

In an embodiment the field diaphragm is configured to adjust a position of a first end of the width of the light sheet and a position of a second end of the width of the light sheet independently of each other. In particular, in an embodiment it is possible to move the scan line sideways with respect to the scanning direction. Thus, the target area may be a parallelogram although the width direction and the scanning direction are perpendicular to each other. In an embodiment, an even greater number of geometries can be chosen for the target area further increasing the flexibility of the light sheet microscope. Also, since there is no need to adjust the angle enclosed by the width direction and the scanning direction in order to adjust the geometry of the target area, fewer elements may be used, thus, making the light sheet microscope more cost effective.

In an embodiment the optical system is configured to form an intermediate image of the light sheet in an intermediate image space, wherein the optical system comprises an optical transport system configured to image the intermediate image of the light sheet from the intermediate image space into the sample space. In particular, in this embodiment the light sheet microscope might be configured to be an oblique plane microscope. The geometry of the light sheet within the sample, in particular the light propagation direction, are defined by the geometry of the light sheet in the intermediate image space. Thus, removing the need for having optical elements such as light deflection elements in the sample space. Thereby, more space is available in the sample space.

In an embodiment the optical transport system comprises a first objective facing the intermediate image space, wherein the optical system comprises an optical detection system for detecting detection light emitted by the sample, said optical detection system having a detector element and a second objective facing the intermediate image space, and wherein the optical axes of the first and second objectives are oblique to each other. Preferably, the optical axis of the second objective and the light propagation direction of the light sheet in the intermediate image space are perpendicular to each other. In an embodiment, the optical transport system transports the light sheet formed into the sample space and the detection light back from the sample space into the intermediate image space. This embodiment is a very simple configuration realizing an oblique plane microscope.

In an embodiment the optical system comprises an optical illumination system configured to form the light sheet from the illumination light in the intermediate image space, and wherein the optical axis of the first objective and the optical axis of the optical illumination system are oblique to each other. The geometry of the light sheet in the sample space is defined by the optical illumination system, i.e. in the intermediate image space. In particular, the angle enclosed by the light propagation direction and the optical axis of the first objective, i.e. the obliqueness of the light sheet in the sample space, is defined by the angle enclosed by the optical axis of the second objective and the optical axis of the optical illumination system. No further light deflection elements are needed in the sample space in order to realize an oblique light sheet. Thus, more of the sample space can be dedicated to receiving the sample, increasing the versatility of the light sheet microscope.

In an embodiment the optical transport system comprises a light deflection element configured to direct illumination light towards the sample and to direct detection light the detection light towards the intermediate image space. In an embodiment, the illumination light is coupled directly into the optical transport system.

Preferably, the optical illumination system comprises a light sheet forming element for forming the light sheet, said light sheet forming element being arranged in an optical path between the intermediate image space and the light source. This light sheet forming element may be e.g. a cylindrical lens or a movable mirror configured to form a quasi-static light sheet from a light beam or any other means known from the prior art.

According an aspect, a light sheet microscope is provided. The light sheet microscope comprising a light source configured to emit illumination light, a manipulation light source configured to emit manipulation light for manipulating a target area of a sample, and an optical system configured to form a light sheet from the illumination light in a sample space. The optical system has an optical transport system configured to transport an intermediate image of the light sheet from an intermediate image space into the sample space, an optical detection system configured to detect detection light emitted by the sample, and an optical erecting unit comprising at least first and second objectives facing the intermediate image space, the first objective being configured to direct light into the optical transport system, and the second objective being configured to direct light into the optical detection system. The optical axes of the first and second objectives are oblique to each other. The optical detection system comprises a light deflection element configured to direct the manipulation light into the second objective.

In an embodiment, the light sheet microscope is configured as an oblique plane microscope.

The manipulation light is coupled into a detection light path of the optical system by the light deflection element. The manipulation light is then directed into the intermediate image space by the second objective. The first objective receives the manipulation light and directs it into the optical transport system. The manipulation light is then transported by the optical transport system into the sample space, where it is used to manipulate the target area of the sample. The optical system used for transporting the manipulation light into the sample space shares many components with an optical system used for forming a light sheet for illuminating the sample already present in typical light sheet microscopes. Thereby, the light sheet microscope is very compact and can be manufactured cost efficiently.

In an embodiment the optical detection system comprises a detector and the light deflection element is configured to direct the detection light to the detector. The light deflecting element is e.g. a dichroitic beam splitter. In this embodiment the detection light path leading to the detector is used to couple the manipulation light into the optical system. Thereby, no additional light path need to be created which makes this embodiment even more compact. Alternatively or additionally, the light deflection element is configured such that it can be removed from the detection light path. Thereby, allowing to switch between a detection mode in which the detector can receive the detection light and a manipulating mode in which the manipulation light is directed into the sample space.

In an embodiment the optical system comprises a light forming element for forming a light pattern from the manipulation light, said light forming element being arranged in an optical path between the light deflection element of the optical detection system and the light source. The light forming element might e.g. be a digital mirror device. The light pattern is imaged into the sample space by the optical system, thereby defining the target area. This allows for a very precise and flexible definition of the target area.

Alternatively, the light forming element is a lens or a lens group configured to focus the manipulation light into a manipulation light beam. The target area is scanned with the manipulation light beam by means of a scanning element. Said scanning element e.g. being arranged in the light path of the optical transport system. In this alternative embodiment the light pattern is a light spot and the target area is defined as the area scanned by the light pattern.

In an embodiment the optical transport system comprises an optical zoom system, which is adjustable for adapting the magnification of the optical transport system to a ratio between two refractive indices, one of which being associated with the sample space and the other being associated with the intermediate image space. The zoom system may be used to move the position of the focal plane of the first objective along its optical axis without moving the sample itself, which might disturb it. In order for this remote focusing to work, the magnification of the optical transport system must be equal to the ratio of the two refractive indices.

By moving the position of the focal plane of the first or second objective along its optical axis, the position of the beam waist of the light sheet, i.e. the target area, is moved along the optical axis of the first objective. This allows e.g. manipulating more than one target area located at different positions along the optical axis of the first objective. Further, this allows to tilt the target area by shifting the focal plane of the first objective while the light sheet is moved along the scanning direction. Thereby making additional geometric configurations of the target area possible and further enhancing to flexibility of the light sheet microscope.

In an embodiment the optical system comprises an objective facing the sample space, and wherein the opening angle of said objective has a value between 17° and 72°, in particular between 45° and 72°. In an embodiment a high numerical aperture can be achieved which is advantageous for most light sheet microscopy techniques, in particular oblique plane microscopy.

In an embodiment the optical system comprises a single objective facing the sample space. The single objective is used for imaging the light sheet into the sample space and for receiving the detection light emitted by the sample. Thereby, most of the sample space can be dedicated towards receiving the sample. Further, in an embodiment the optical axis of the single objective may be perpendicular to a cover slip holding the sample. This greatly reduces light loss and aberrations caused by reflections on the cover slip.

In an embodiment the scanning direction is perpendicular to an optical axis of the single objective. This allows for a simple geometric configuration of the optical system, since the scanning direction is located in or parallel to the focal plane of the single objective.

In an embodiment the target area is located in a focal plane of the single objective. In this embodiment, no remote focusing is necessary in order to focus the light sheet in the target area. This greatly simplifies the optical design of the optical system.

In an embodiment the illumination light source and/or the manipulation light sources comprises a pulsed laser. Pulsed laser can efficiently achieve the high intensities needed for photo-manipulating the sample.

According to an aspect, a method for manipulating a target area of a sample using a light sheet microscope is provided. The methods comprises the following steps: Forming a light sheet from illumination light in a sample space, said light sheet being focused in a thickness direction perpendicular to a light propagation direction thereof to form a beam waist in said thickness direction. Adjusting the width of the light sheet. Moving the light sheet by a scanning distance in order to manipulate the target area of the sample by scanning the target area with the beam waist of the light sheet, said target area being defined by the width of the light sheet and the scanning distance.

The method has the same advantages as the microscope.

Figure 2:
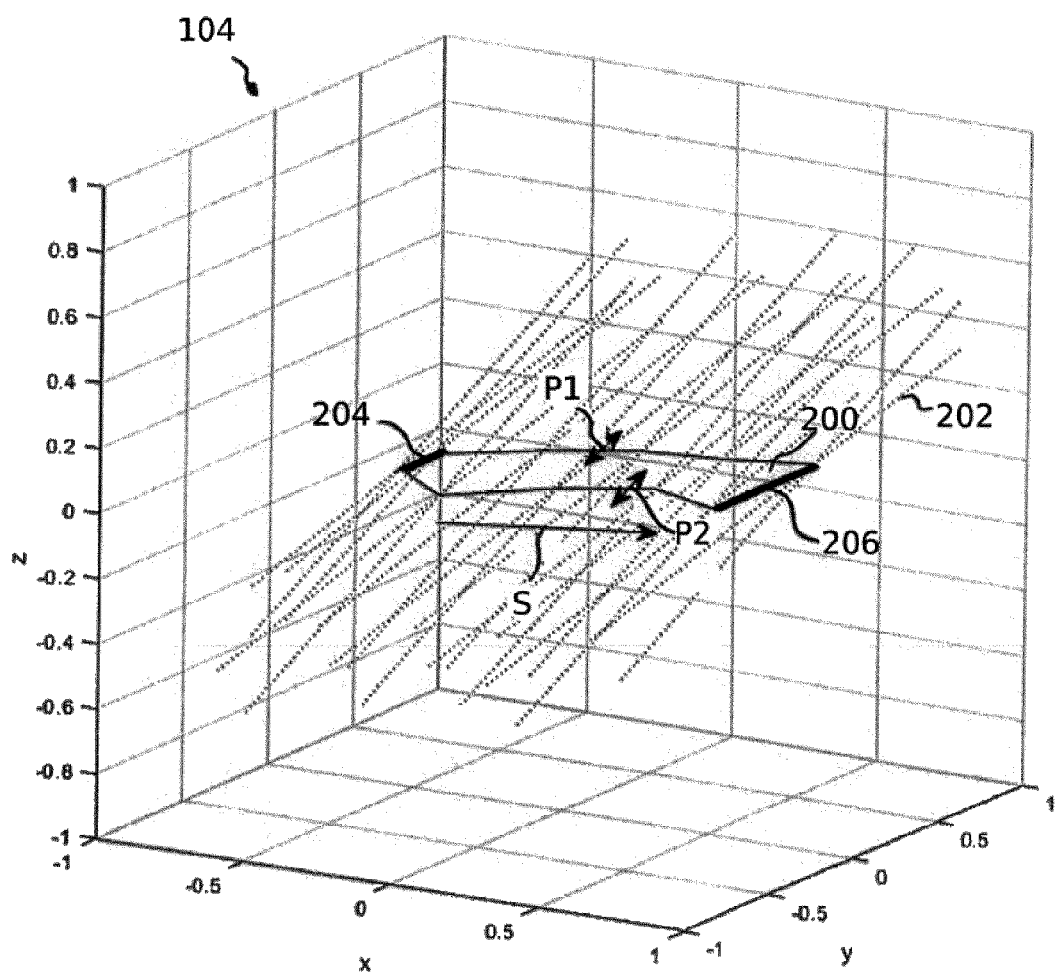
FIG. 2 is a schematic diagram of a sample space of the light sheet microscope according to FIG. 1.

FIG. 1 shows a schematic diagram of a light sheet microscope 100 according to an embodiment. FIG. 1 also shows a coordinate cross 102 defining coordinates in a sample space 104 of the light sheet microscope 100 (c.f. FIG. 2). The light sheet microscope 100 comprises a light source 106, an optical system 108, and a control unit 110.

The light source 106 is configured to emit illumination light, in particular laser light. In the present embodiment, the light source 106 is exemplarily configured to be a pulsed laser. However, the light source 106 may also be a continuous laser or an assembly of two or more lasers and a beam combining element configured to combine the laser light beams emitted by the two or more lasers into a single laser light beam. Also, the light source 106 may be a source of incoherent light.

The illumination light is then formed into a light sheet by the optical system 108 in the sample space 104 of the light sheet microscope 100 in order to manipulate a sample 146. The optical system 108 comprising an optical illumination system 112 and an optical transport system 114. The optical illumination system 112 is configured to form the light sheet from the illumination light in an intermediate image space 116. The optical transport system 114 is configured to form an image of the light sheet in the sample space 104 and to form an image of an object plane in the sample space 104 in the intermediate image space 116. The optical system 108 further comprises an optical detection system 136 configured to detect the image formed by the optical transport system 114.

The optical illumination system 112 comprises a light sheet forming element 118, for example a cylindrical lens or a scanning element, an illumination objective 119 configured to direct the light sheet into the intermediate image space 116. The light sheet is focused in a thickness direction perpendicular to a light propagation direction thereof and forms a beam waist in said thickness direction. The optical illumination system 112 further comprises an adjustable field diaphragm 120 which is configured to be adjustable in order vary a width of the light sheet in a width direction being perpendicular to both the light propagation direction and the thickness direction.

The optical transport system 114 forms a transport system in the sense that it is configured to transport the light sheet from the intermediate image space 116 into the sample space 104 and the image of the object plane from the sample space 104 into the intermediate image space 116. In other words, the optical system 108 transports the illumination light and detection light emitted by the sample 146 from the intermediate image space 116 to the sample space 104 and back, respectively.

In the present embodiment, the optical transport system 114 is telecentric. The optical system 108 comprises an image side objective 132, a first tube lens 130, a first ocular 128, a second ocular 126, a second tube lens 124, and an object side objective 122, in this order from the intermediate image space 116. The optical transport system 114 further comprises a scanning element 134 arranged between the first and second oculars. Said scanning element 134 being configured to move the light sheet through the sample space 104 along a scanning direction perpendicular to the optical axis O of the objective. In an embodiment the scanning element 134 may be an e.g. piezo driven objective actuator configured to drive the object side objective 132.

The optical detection system 136 comprises a detection objective 138, a tube lens 140, and a detector 142. The detection objective 138 and the tube lens 140 are configured to image the intermediate image space 116 onto the detector 142. This means that the image of the sample space 104 formed by the optical transport system 114 in the intermediate image space 116 is imaged onto the detector 142. In other words, the image is detected by the detector 142.

The control unit 110 comprises an input device 144 for inputting the geometry of the target area and is connected to the scanning element 134, the field diaphragm 120, the light source 106, and the detector 142. The control unit 110 is further configured to manipulate a target area 200 (see FIG. 2) of the sample 146 by controlling the scanning element 134 and the field diaphragm 120. The scanning element 134 is controlled for moving the light sheet along a scanning direction by a scanning distance. The field diaphragm 120 is adjusted for setting the width of the light sheet. The field diaphragm 120 may be adjusted once before the light sheet is moved along the scanning direction or continuously while the light sheet is moved in order to determine the exact geometry of the target area 200. How the geometry of the target area 200 is defined by adjusting the field diaphragm 120 is explained in more detail below with reference to FIG. 2.

FIG. 2 shows a schematic diagram of the sample space 104 of the light sheet microscope 100 according to FIG. 1. FIG. 2 also shows a coordinate grid defining coordinates in the sample space 104. A first coordinate axis X is parallel to the scanning direction, a second coordinate axis Y is perpendicular to the scanning direction and the optical axis O of the objective directed at the sample space 104, and a third coordinate axis Z is parallel the optical axis O of said objective.

The target area 200 is shown in FIG. 2 as a polygon with a solid outline. The sample 146 is manipulated in the target area 200 by moving a beam waist of light sheet, i.e. the part of the light sheet where its thickness is minimal and the intensity density of the light sheet is highest, along the scanning direction in a scanning motion. The scanning direction is shown in FIG. 2 as an arrow S. The light sheet is indicated by dotted lines 202 crossing each other at the position of the beam waist. The position of the beam waist at the start of the scanning motion is shown in FIG. 2 as a first thick line 204 and the position of the beam waist at the end of the scanning motion is shown in FIG. 2 as a second thick line 206. The width of the light sheet is varied during the scanning motion, as is shown in FIG. 2 by two double-headed arrows P1, P2. This allows the target area 200 to be the polygon instead of a rectangle or parallelogram.

Figure 3:
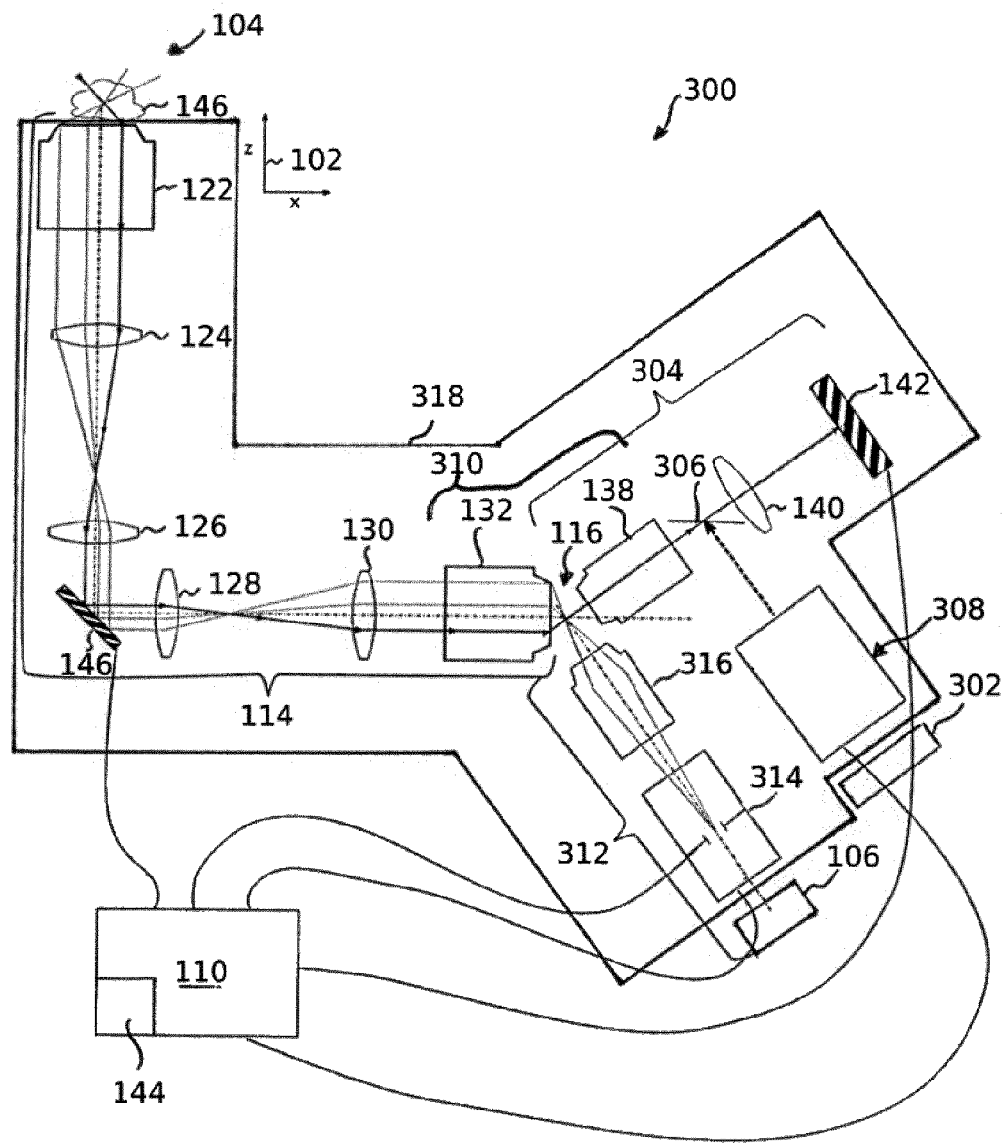
FIG. 3 is a schematic diagram of a light sheet microscope according to an embodiment.

FIG. 3 shows a schematic diagram of a light sheet microscope 300 according to another embodiment. The light sheet microscope 300 according to FIG. 3 is distinguished from the light sheet microscope 100 according to FIG. 1 in a manipulation light source 302. The manipulation light source 302 is configured to emit manipulation light for manipulating a target area 400 (see FIG. 4) of the sample 146.

The optical system 318 comprises a light forming element 308 configured to form the manipulation light into a light pattern, e.g. a digital mirror device, a spatial light modulator, or a scanning mirror. The light pattern is either static or quasi-static, e.g. a light pattern created by a fast moving scanning mirror. Alternatively, the light forming element 308 is a lens or a set of lenses and the light pattern may be a focused light spot. After leaving the light forming element 308, the formed manipulation light is directed into the optical detection system 304.

The optical detection system 304 comprises a light deflection element 306, which is exemplarily formed as a beam splitter. The light deflection element 306 is configured to direct the detection light to the detector 142 and to direct the manipulation light to the objective 138 of the optical detection system 304. The manipulation light is then directed by the objective 136 into the intermediate image space 116 and imaged into the sample space 104 by means of the optical transport system 114.

The objective 132 of the optical transport system 114 and the objective 138 of the optical detection system 304 define an optical erecting unit 312 configured to image an oblique image plane of the sample 146. Due to the geometry of the optical erecting unit 310 the target area 400 is tilted as is shown in FIG. 4.

The optical system 318 of the light sheet microscope 300 further comprises a light sheet illumination system 312, that is configured to form a light sheet for illuminating the sample 146 in an intermediate image space 116. Said light sheet illumination system 312 comprising a light sheet forming element 314, for example a cylindrical lens or a scanning element, and an illumination objective 316 configured to direct the light sheet into the intermediate image space 116.

Figure 4:
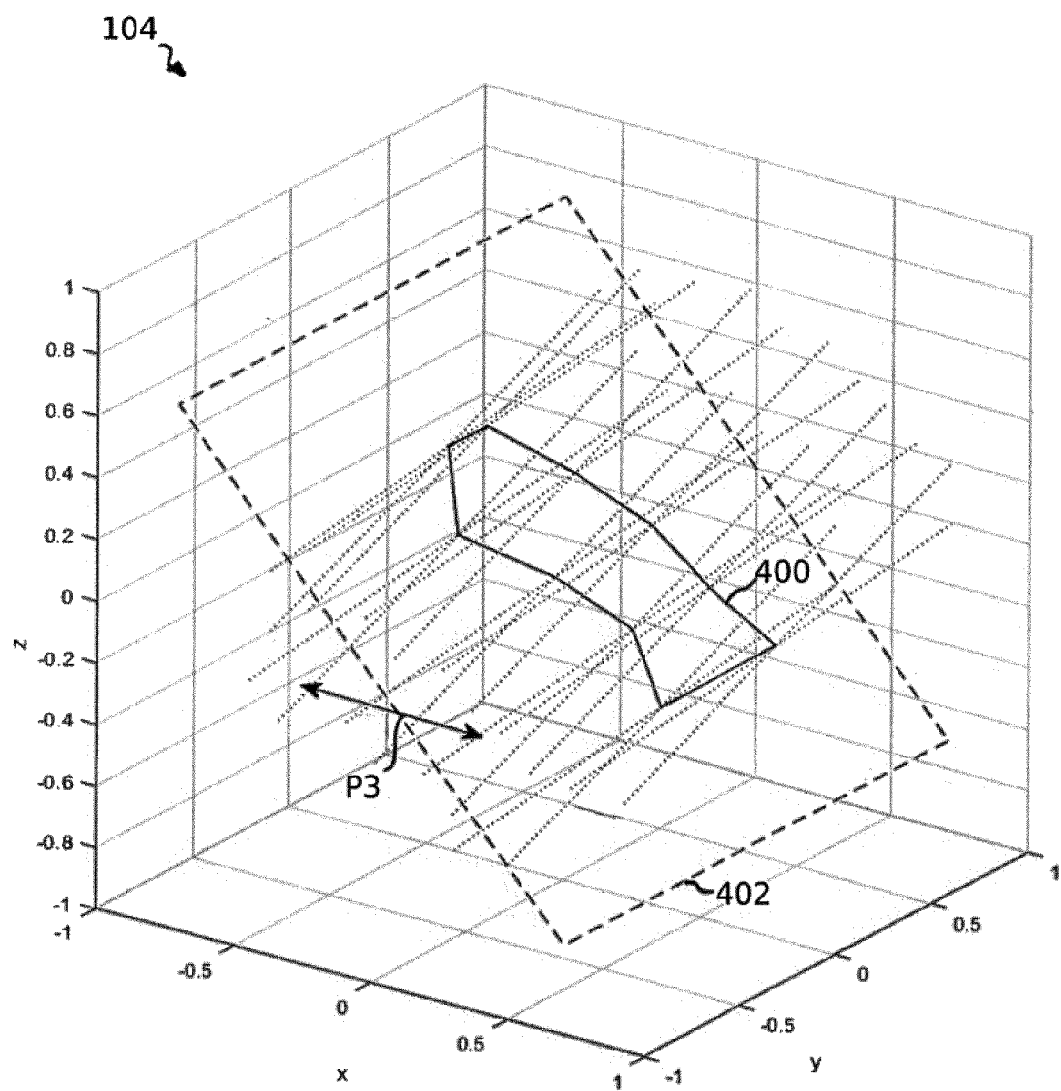
FIG. 4 is a schematic diagram of a sample space of the light sheet microscope according to FIG. 3.

FIG. 4 shows a schematic diagram of the sample space 104 of the light sheet microscope 300 according to FIG. 3. The plane 402 in the which the target area 400 is located is indicated by a dashed rectangle. As can be seen in FIG. 4 the target area 400 are tilted with respect to the y axis.

By adjusting the scanning element 134, the whole plane in the which the target area 400 is located is moved along the x axis. This is indicated in FIG. 4 by a double-headed arrow P3 By adjusting the scanning element 134 each time the scanning motion is completed, multiple target areas located in different planes arranged along the x axis in sequence are manipulated. Thus, a volume or stack formed by the target areas is manipulated. Alternatively, it is possible to adjust the scanning element 134 during the scanning motion. Thereby, the target area 400 may be non-flat.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Microscope
102 Coordinate cross
104 Sample space
106 Light source
108 Optical system
110 Control unit
112 Optical illumination system
114 Optical transport system
116 Intermediate image space
118 Light sheet forming element
119 Objective
120 Field diaphragm
122 Objective
124 Tube lens
126, 128 Ocular
130 Tube lens
132 Objective
134 Scanning element
136 Optical detection system
138 Objective
140 Tube lens
142 Detector
144 Input device
146 Sample
200 Target area
202 Dotted line
204, 206 Thick line
300 Microscope
302 Manipulation light source
304 Optical detection system
306 Light deflection element
308 Light forming element
310 Optical erecting system
312 Light sheet illumination system
314 Light sheet forming element
316 Objective
400 Target area
402 Plane
P1, P2, P3 Double-headed arrow
S Arrow

The invention claimed is:

1. A light sheet microscope, comprising:
a light source configured to emit illumination light;
an optical system configured to form a light sheet from the illumination light in a sample space, the light sheet being focused in a thickness direction perpendicular to a light propagation direction thereof to form a beam waist in the thickness direction,
wherein the optical system has a field diaphragm adjustable to vary a width of the light sheet in a width direction, the width direction being perpendicular to both the light propagation direction and the thickness direction;
a scanning element configured to move the light sheet a scanning distance in the sample space in a scanning motion along a scanning direction; and
a control unit configured to control the field diaphragm for adjusting the width of the light sheet and to control the scanning element for moving the light sheet by the scanning distance in order to manipulate a target area of a sample by scanning the target area with the beam waist of the light sheet, the target area being defined by the width of the light sheet and the scanning distance,
wherein the control unit is configured to control the field diaphragm and the scanning element such that the width of the light sheet is varied during the scanning motion of the light sheet along the scanning direction.

2. The light sheet microscope according to claim 1, wherein the target area is a polygon other than a parallelogram.

3. The light sheet microscope according to claim 1, wherein the field diaphragm is configured to adjust a position of a first end of the width of the light sheet and a position of a second end of the width of the light sheet independently of each other.

4. The light sheet microscope according to claim 1, wherein the optical system is configured to form an intermediate image of the light sheet in an intermediate image space, wherein the optical system comprises an optical transport system configured to image the intermediate image of the light sheet from the intermediate image space into the sample space.

5. The light sheet microscope according to claim 4, wherein the optical transport system comprises a first objective facing the intermediate image space, wherein the optical system comprises an optical detection system for detecting detection light emitted by the sample, the optical detection system having a detector and a second objective facing the intermediate image space, and wherein optical axes of the first and second objectives are oblique to each other.

6. The light sheet microscope according to claim 5, wherein the optical system comprises an optical illumination system configured to form the light sheet from the illumination light in the intermediate image space, and wherein the optical axis of the second objective and an optical axis of the optical illumination system are oblique to each other.

7. The light sheet microscope according to claim 4, wherein the optical transport system comprises an optical zoom system, which is adjustable for adapting a magnification of the optical transport system to a ratio between two refractive indices, one of which being associated with the sample space and the other being associated with the intermediate image space.

8. The light sheet microscope according to claim 1, wherein the optical system comprises an objective facing the sample space, and wherein an opening angle of the objective has a value between 17° and 72°.

9. The light sheet microscope according to claim 8, wherein the opening angle of the objective has a value between 45° and 72°.

10. The light sheet microscope according to claim 1, wherein the optical system comprises a single objective facing the sample space.

11. The light sheet microscope according to claim 10, wherein the target area is located in a focal plane of the single objective.

12. The light sheet microscope according to claim 1, wherein the illumination light source comprises a pulsed laser.

13. A light sheet microscope, comprising:
a light source configured to emit illumination light;
a manipulation light source configured to emit manipulation light for manipulating a target area of a sample;
an optical system configured to form a light sheet from the illumination light in a sample space, the light sheet having a width in a width direction, the width direction being perpendicular to both a light propagation direction and a thickness direction;
wherein the optical system has an optical transport system configured to transport an intermediate image of the light sheet from an intermediate image space into the sample space;
an optical detection system configured to detect detection light emitted by the sample; and
an optical erecting unit comprising a first objective and a second objective facing the intermediate image space, the first objective being configured to direct the manipulation light into the optical transport system, and the second objective being configured to direct the detection light into the optical detection system,
wherein the optical detection system comprises a light deflection element configured to direct the manipulation light into the second objective, and
wherein optical axes of the first objective and the second objective are oblique to each other, so that the target area is tilted with respect to the width direction of the light sheet.

14. The light sheet microscope according to claim 13, wherein the optical detection system comprises a detector, and wherein the light deflection element is configured to direct the detection light to the detector.

15. The light sheet microscope according to claim 13, wherein the optical system comprises a light forming element for forming a light pattern from the manipulation light, the light forming element being arranged in an optical path between the light deflection element of the optical detection system and the manipulation light source.

16. A method for manipulating a target area of a sample using a light sheet microscope, the method comprising:
forming a light sheet from illumination light in a sample space, the light sheet being focused in a thickness direction perpendicular to a light propagation direction thereof to form a beam waist in the thickness direction,
adjusting a width of the light sheet in a width direction, the width direction being perpendicular to both the light propagation direction and the thickness direction, and
moving the light sheet by a scanning distance in a scanning motion along a scanning direction in order to manipulate the target area of the sample by scanning the target area with the beam waist of the light sheet, the target area being defined by the width of the light sheet and the scanning distance, wherein the adjusting the width of the light sheet is performed during the scanning motion of the light sheet along the scanning direction.

* * * * *